Feb. 5, 1946.   R. I. SCHONITZER   2,394,014
COMBINED DOOR-HINGING, DOOR-CHECKING, AND DOOR-HOLDING DEVICE
Original Filed Aug. 2, 1940
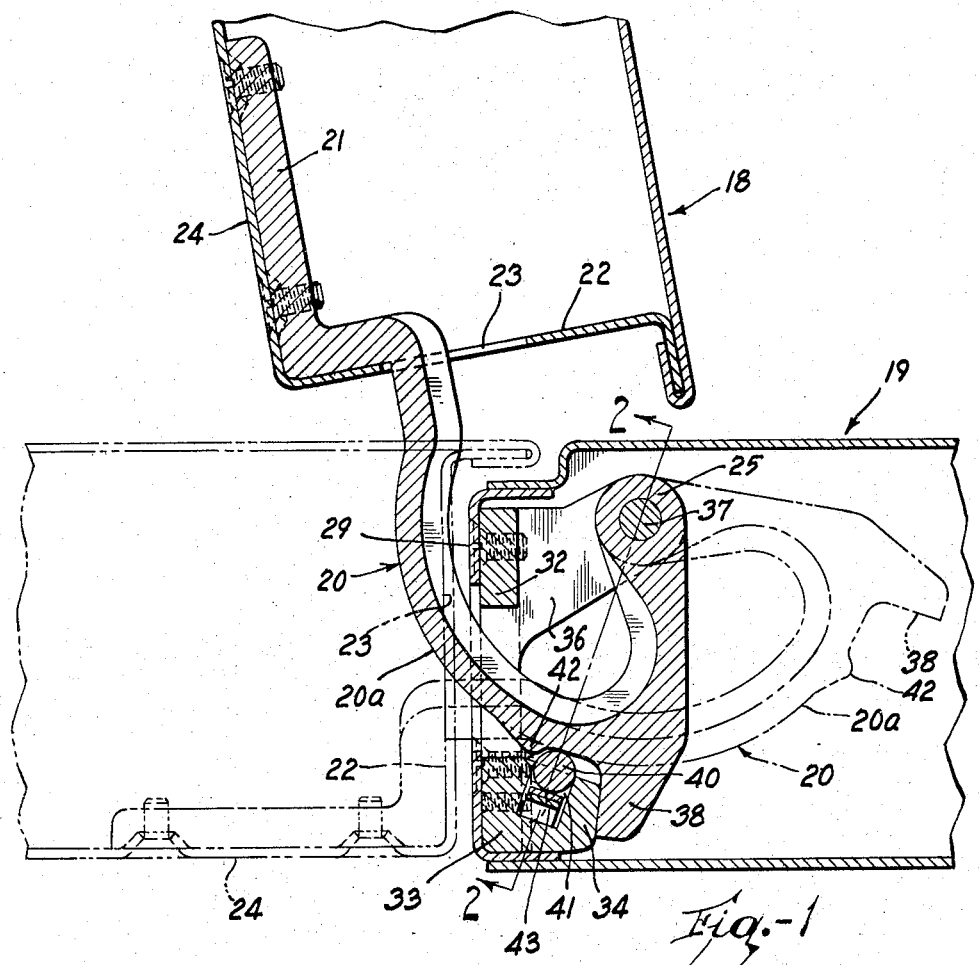
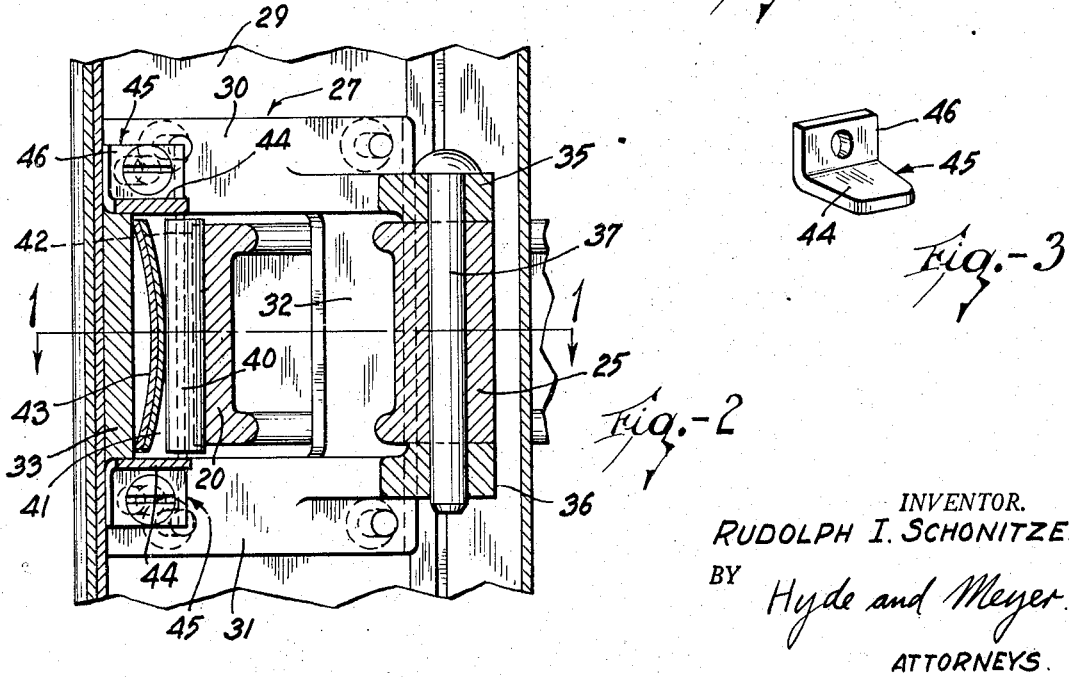
INVENTOR.
RUDOLPH I. SCHONITZER
BY Hyde and Meyer.
ATTORNEYS.

Patented Feb. 5, 1946

2,394,014

UNITED STATES PATENT OFFICE 2,394,014

COMBINED DOOR-HINGING, DOOR-CHECKING, AND DOOR-HOLDING DEVICE

Rudolph I. Schonitzer, Shaker Heights, Ohio

Original application August 2, 1940, Serial No. 349,888, now Patent No. 2,343,810, dated March 7, 1944. Divided and this application August 21, 1943, Serial No. 499,751

8 Claims. (Cl. 16—135)

This invention relates to combined door-hinging, door-checking and door-holding devices, the use with a door and its supporting structure of a device embodying the present invention (1) enabling said door to be hinged (by parts which are concealed when the door is closed) on its supporting structure, it being understood that one or more other hinge means generally will be used for the complete hinging of said door; (2) enabling the opening movement of said door to be checked or arrested when said door reaches the position desired for its fully open position; and (3) enabling said door to be releasably held or retained against closing from a predetermined open position, such as the fully open position of said door.

The present invention has for its general objects the provision of a device of the character described by which two or all three of the aforesaid functions may be effectively accomplished, the construction of such device and the arrangement of its parts being such that said device may be inexpensively manufactured and easily assembled with a door and its supporting structure.

Although the field of use of the present invention obviously is not limited to automobile doors, devices embodying such invention are particularly useful therewith, as will hereinafter appear.

More specific objects of the present invention are in part obvious and in part will appear more in detail hereafter.

The present invention will be readily understood from the following description of one embodiment thereof as used with an automobile door, reference being had to the accompanying drawing in which:

Fig. 1 is a longitudinal horizontal sectional view through the hinge edge portion of an automobile door and a corresponding portion of the automobile body on which said door is hinged by the use of a device embodying the present invention, the view being on the line 1—1, Fig. 2, the door being shown in full lines in its fully open position, the position in which it is releasably held or retained by such device, and the closed position of said door being indicated in dot-dash lines;

Fig. 2 is a detail vertical sectional view, on the line 2—2, Fig. 1; and

Fig. 3 is a perspective view of one of the groove-closing angle members of said device.

Before the present invention is described in detail, it is to be understood that such invention is not limited to the details of construction or the specific arrangement of parts herein illustrated or described, as the invention obviously may take other forms. It also is to be understood that the phraseology or terminology herein employed is for the purpose of description and not of limitation.

In the accompanying drawing, wherein is illustrated one form of device embodying the present invention, the reference numeral 18 designates a generally hollow sheet metal automobile door, such as is now in general use, and of which door only the hinge edge portion is here shown; and 19 designates the automobile body portion (hereinafter termed a body pillar) on which said door is hinged by said device, it being understood that other hinge means (not here shown) generally will be used in conjunction with the present device for the complete hinging of said door on said body pillar.

As best shown in Fig. 1, the device constituting the herein illustrated embodiment of the present invention includes a hinge leaf 20 of the so-called goose neck form, one end of said hinge leaf being pivotally secured to or associated with the body pillar 19 and the other end of said hinge leaf being rigidly or immovably secured to or associated with the door 18. As a result, said door not only is supported on said body pillar (and in the appended claims, said body pillar is designated as a supporting structure for the door structure hinged thereon) but also, is free to swing about its hinge axis (to be later referred to) between its fully closed position, indicated in dot-dash lines in Fig. 1, and its fully open position, shown in full lines in Fig. 1, all as will be readily understood.

As here shown, the rigidly secured end portion 21 of the hinge leaf 20 lies within the hinge edge portion of the door 18 (the hinge edge wall 22 of said door being provided with a suitable opening 23 to receive such end portion of said hinge leaf) and is screwed or otherwise immovably secured to the sheet metal inner side wall 24 of said door, said door being provided, as is usual, with a suitable trim panel or the like (not shown) by which its inner side wall 24 is desirably covered. For the pivotal connection of the other end 25 of said hinge leaf to the body pillar 19, a suitable metal bracket 27 is here utilized, said bracket being arranged within said body pillar and having its generally vertically disposed base screwed or otherwise rigidly secured to the body pillar hinge edge wall 29.

As here shown, the bracket base comprises generally parallel top and bottom portions 30 and 31, respectively, and generally parallel side portions 32 and 33, the side portion 33 (the inner side portion as here shown) being of increased thickness, as at 34, for all or a substantial part of its length, as best shown in Fig. 1, and for a purpose to be hereinafter referred to. The bracket base is thus provided with a central opening, in registry with an opening with which the body hinge edge wall 29 is provided, and through such openings the hinge leaf 20 extends at all times. Integral with or otherwise suitably secured to said bracket base, such as with or to the top and bottom base portions 30 and 31, is a pair of rearwardly extending, vertically spaced and generally horizontal lugs 35 and 36, the rear end portions of which have aligned apertures for the reception of a pintle 37 upon which the hinge leaf 20 is pivotally mounted, the spacing of said lugs being sufficient to permit said hinge leaf to swing therebetween as the door 18 is opened and closed.

For checking or arresting opening movement of the door 18, when said door reaches the position desired for its fully open position (the full line position of the door in Fig. 1), the hinge leaf 20 is provided with a suitable projection 38, which by its engagement with the thickened side portion 33 of the bracket base effectively checks or arrests opening movement of said door. As here shown, this checking projecting 38 is an integral part of the hinge leaf, and is located on the inner surface of the rear end of its intermediate arcuate shaped section 20a, as best shown in Fig. 1.

For the releasable retention of the door 18 in an open condition, such as in its fully open position, whenever it is moved thereto, the present device includes an elongated retaining roller 40, located within a longitudinally disposed groove 41 of the thickened side portion 33 of the bracket base and cooperating with means of the hinge leaf 20 for the accomplishment of said door retaining function. In the present embodiment of the invention, said cooperating hinge leaf means comprises a projection 42, which is adapted to pass over the roller 40 and to lie in front of said roller for door-retaining purposes, the projection 42 preferably and as here shown being an integral part of said hinge leaf. To normally urge said roller outwardly from its groove 41, into engagement at all times with the inner surface of the arcuate section 20a of the hinge leaf 20, suitable resilient means is interposed between said roller and the base of said groove. As here shown, said resilient means comprises a pair of leaf springs 43, the arched intermediate portions of which engage or are effective upon said roller, although if desired, said leaf springs may be turned around to enable their end portions to engage or to be effective upon said roller. To prevent escape of said roller and its leaf springs from the bracket base groove 41 in which they are located, the ends of said groove are here closed by the portions 44 of a pair of metal angle members 45, of which one is illustrated per se in Fig. 3, the attaching portions 46 of said angle members, here shown as apertured, being screwed or otherwise suitably secured to the top and bottom base portions 30 and 31 of the bracket 27, as best shown in Fig. 2.

During opening movement of the door 18, the hinge leaf 20 swings in a clockwise direction (as viewed in Fig. 1) and just before the fully open position of said door is reached, the projection 42 of said hinge leaf strikes the roller 40 and moves said roller inwardly into its groove 41 and against the outward force of its leaf springs 43 sufficiently to permit said hinge leaf projection to travel forwardly beyond said roller. Immediately thereafter, said roller moves outwardly, under the influence of its leaf springs, and its location behind or to the rear of the hinge leaf projection 42 enables said roller to constitute a resilient resistance to closing or counter-clockwise movement of said door.

Preferably and as here shown, the spacing of the hinge leaf projections 38 and 42 is such that the door-holding projection 42 of the hinge leaf lies just in front of the roller 40 when the checking projection 38 of said hinge leaf is in engagement with the side wall portion 33 of the bracket base. This enables the door 18 to be releasably held or retained in its fully open position, with attendant advantages quite evident to all.

A further feature of the present embodiment of the invention is that the inner surface of the hinge leaf section 20a—the section which is engaged by the vertically disposed roller 40—is generally the arc of a circle of which the center coincides with the hinge axis of the door 18 (the longitudinal axis of the pintle 37). As a result, a substantially constant pressure is exerted upon said roller by the hinge leaf as the latter swings back and forth during opening and closing movement of said door.

A further feature of the device here illustrated is that the roller 40 is as far as is practical from the hinge axis of the door 18, the result of which is the securement of a maximum door-holding or door-retaining effect by the exertion of minimum force by the roller leaf springs 43.

To those skilled in the art to which the present invention relates, further features and advantages of devices embodying such invention will be evident from the foregoing description of one such embodiment.

The present application is a division of my co-pending application for Combined door-hinging, door-checking and door-holding devices, Serial No. 349,888, filed August 2, 1940, United States Patent No. 2,343,810 having issued on said application on March 7, 1944.

What I claim is:

1. A combined door-hinging and door-holding device, comprising hinge leaf means for rigid securement to a door, bracket means for rigid securement to the supporting structure for said door, said hinge leaf means being pivotally connected to said bracket means adjacent the outer side wall of said supporting structure and extending at all times through an opening in the hinge edge wall of said door supporting structure, and retaining means carried by said bracket means adjacent the inner side wall of said supporting structure for cooperation with said hinge leaf means in releasably holding said door from closing from a predetermined open position, said retaining means being engageable at all times with said hinge leaf means.

2. A combined door-hinging and door-holding device, comprising hinge leaf means for rigid securement to a door, bracket means for rigid securement to the supporting structure for said door and provided adjacent its outer side with a pair of spaced lugs, said hinge leaf means being pivotally connected to said lugs for swinging movement therebetween as the door opens and closes, said bracket means also being provided adjacent its inner side with a socket, rollable means located in said socket and spring urged into engagement at all times with said hinge leaf means, and means carried by said hinge leaf means for cooperation with said rollable means in releasably holding said door from closing from a predetermined open position.

3. A combined door-hinging, door-checking and door-holding device, comprising hinge leaf means for rigid securement to a door, bracket means for rigid securement to the supporting structure for said door and to which bracket means said hinge leaf means is pivotally connected, said bracket means being provided with a recess containing portion, retaining means in said recess, projecting means on said hinge leaf means for contact with said recess containing portion in checking opening movement of said door when said door reaches a predetermined open position, and other means on said hinge leaf means for cooperation with said retaining means in releasably holding said door from closing from a predetermined open position.

4. A combined door-hinging, door-checking and door-holding device, comprising a hinge leaf for rigid securement to a door, bracket means for rigid securement to the supporting structure for said door and having portions thereof for location adjacent the outer side wall of said door supporting structure, said hinge leaf being pivotally connected to such portions of said bracket means, a pair of separated projections carried by said hinge leaf in spaced relation to the pivot thereof, and means for securement to said door supporting structure adjacent the inner side wall thereof and having a pair of spaced abutments which are disposed between and which are cooperable with said hinge leaf projections when said door is in a predetermined open position, the cooperation of one of said abutments and one of said projections restraining movement of said hinge leaf in a door-opening direction, whereby further opening movement of said door is checked or arrested, the other of said abutments being of yieldable form and the cooperation of that abutment and the other of said projections releasably holding said hinge leaf from movement in a door-closing direction, whereby closing movement of said door from such predetermined open position is yieldingly resisted.

5. A combined door-hinging and door-holding device, comprising hinge leaf means of generally goose neck form for rigid securement to a door and having a part for pivotal securement to and enclosure by the supporting structure for said door, retaining means for association with and enclosure by said supporting structure and engageable at all times with a section of said hinge leaf means, said section of said hinge leaf means being substantially the arc of a circle of which substantially the center is the pivot center of said hinge leaf means, and such section of said hinge leaf means having means for cooperation with said retaining means in releasably holding said door from closing from a predetermined open position.

6. A combined door-hinging, door-checking and door-holding device, comprising a hinge leaf of generally goose-neck form having an end portion for rigid securement to a door and an end portion for pivotal connection to the supporting structure for said door, an abutment carried by said door supporting structure, a projection carried by said hinge leaf intermediate its aforesaid end portions for cooperation with said abutment when said door reaches a predetermined open position to thereby resist further opening movement of the door, a second abutment carried by said door supporting structure in spaced relation to said first mentioned abutment, and a second projection carried by said hinge leaf intermediate its aforesaid end portions for cooperation with said second abutment when said door is in a predetermined open position to thereby resist closing movement of said door from such open position, the projections of said hinge leaf extending laterally therefrom in the same direction and being spaced apart along its length, the two abutments lying between the two projections when closing and opening movements of said door are being resisted as aforesaid.

7. A combined door-hinging and door-holding device, comprising hinge leaf means of generally goose neck form having a part for rigid securement to a door and having another part for pivotal securement to and enclosure by the supporting structure for said door, said hinge leaf means extending at all times through an opening in the hinge edge wall of said door supporting structure, retaining means for association with and enclosure by said supporting structure, said retaining means being located at all times in the plane of said hinge leaf means, and resilient means located at all times in the aforesaid plane and normally urging said retaining means into the path of travel of a projection carried by said hinge leaf means between the aforesaid parts thereof, the projection of said hinge leaf means and said retaining means cooperating, when the door reaches a predetermined open position, to yieldingly resist closing movement of the door from such open position.

8. A combined door-hinging, door-checking and door-holding device, comprising hinge leaf means of generally goose neck form having a part for rigid securement to a door and having another part for pivotal securement to and enclosure by the supporting structure for said door, said hinge leaf means having a pair of laterally extending and longitudinally spaced projections intermediate the aforesaid parts thereof, bracket means for securement to said door supporting structure and having an abutment lying in the path of travel of one of said projections, the engagement of such projection with said abutment means, when the door reaches a predetermined open position, checking or arresting further opening movement of said door, and yieldable retaining means carried by said bracket means in the plane of said hinge leaf means and movable into and out of retaining cooperation with the other of said projections, the cooperation of said retaining means and said last mentioned projection being effective to releasably resist closing movement of said door from a predetermined open position.

RUDOLPH I. SCHONITZER.